(12) United States Patent
Graves et al.

(10) Patent No.: US 9,422,865 B2
(45) Date of Patent: Aug. 23, 2016

(54) BI-METAL FASTENER FOR THERMAL GROWTH COMPENSATION

(71) Applicant: Rolls-Royce Corporation, Indianapolis, IN (US)

(72) Inventors: Charles B. Graves, Avon, IN (US); Jack D. Petty, Sr., Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 313 days.

(21) Appl. No.: 14/104,694

(22) Filed: Dec. 12, 2013

(65) Prior Publication Data

US 2014/0260320 A1 Sep. 18, 2014

Related U.S. Application Data

(60) Provisional application No. 61/786,123, filed on Mar. 14, 2013.

(51) Int. Cl.
| | |
|---|---|
| *F02C 7/20* | (2006.01) |
| *F23M 5/04* | (2006.01) |
| *F23R 3/00* | (2006.01) |
| *F23R 3/60* | (2006.01) |

(52) U.S. Cl.
CPC *F02C 7/20* (2013.01); *F23M 5/04* (2013.01); *F23R 3/002* (2013.01); *F23R 3/007* (2013.01); *F23R 3/60* (2013.01)

(58) Field of Classification Search
CPC ........... F02C 7/20; F23M 5/04; F23R 3/002; F23R 3/007; F23R 3/60
USPC .................. 60/798, 753, 796, 797, 799, 800
See application file for complete search history.

(56) References Cited

U.S. PATENT DOCUMENTS

| 4,975,014 A | 12/1990 | Rufin et al. |
| 5,186,006 A * | 2/1993 | Petty ....................... F01D 9/023 60/753 |
| 5,445,469 A | 8/1995 | Huck et al. |
| 5,592,814 A | 1/1997 | Palusis et al. |
| 5,624,256 A * | 4/1997 | Pfeiffer .................... F23M 5/04 110/336 |

(Continued)

FOREIGN PATENT DOCUMENTS

| EP | 1310735 A1 | 5/2003 |
| EP | 1775517 A2 | 4/2007 |

(Continued)

OTHER PUBLICATIONS

Silicon Carbide, Reaction-Bonded, SiSiC; www.matweb.com.*

(Continued)

*Primary Examiner* — Steven Sutherland
(74) *Attorney, Agent, or Firm* — Fishman Stewart PLLC

(57) ABSTRACT

An improved fastening system and method overcomes traditional thermal mismatch that occurs with standard fastener systems that are employed in extreme temperature environments. The fastening system could employ a metallic fastener that is combined with metallic spacer, each of which having a differing thermal growth coefficient. This arrangement may reduce thermal expansion by several orders of magnitude over the range of temperatures where the thermal fastener can be applied. Such an improved fastening system may be employed in gas turbine machines and in other locations where it is desirable to improve fastening of objects in extreme temperature environments.

20 Claims, 2 Drawing Sheets

(56) References Cited

U.S. PATENT DOCUMENTS

| | | |
|---|---|---|
| 6,045,310 A | 4/2000 | Miller et al. |
| 6,102,610 A | 8/2000 | Palusis et al. |
| 6,718,774 B2 | 4/2004 | Razzell |
| 6,895,761 B2 | 5/2005 | Mitchell et al. |
| 7,153,054 B2 | 12/2006 | Arbona |
| 7,261,489 B2 | 8/2007 | Arbona et al. |
| 7,581,301 B2 | 9/2009 | Arbona et al. |
| 2009/0193813 A1* | 8/2009 | Garry .................. F23M 5/04 60/796 |
| 2011/0027569 A1 | 2/2011 | Richards |
| 2012/0234402 A1 | 9/2012 | Richards |

FOREIGN PATENT DOCUMENTS

| | | |
|---|---|---|
| EP | 2085697 A2 | 8/2009 |
| EP | 2325443 A2 | 5/2011 |
| EP | 2546574 A2 | 1/2013 |

OTHER PUBLICATIONS

Special Metals NIMONIC Alloy 263; www.matweb.com.*
Haynes 25 alloy; Heat Resistant Alloy at a Glance; 2008.*
Haynes 263 alloy; Heat Resistant Alloy at a Glance; 2008.*
International Serch Report PCT/US2013/074908 mailed on Jul. 18, 2014.

* cited by examiner

US 9,422,865 B2

BI-METAL FASTENER FOR THERMAL GROWTH COMPENSATION

CROSS-REFERENCE TO RELATED APPLICATIONS

This application claims priority to U.S. Provisional Patent Application No. 61/786,123 filed Mar. 14, 2013, the contents of which are hereby incorporated in their entirety.

FIELD OF TECHNOLOGY

An improved fastening system for securing members together is presented, and more particularly, but not exclusively, an improved fastening system for securing ceramic matrix composite parts to a metal structure that operates in extreme temperature environments such as, but not limited to, a gas turbine engine.

BACKGROUND

Gas turbine engine combustors are subjected to and must meet stringent emission standards. This means that the wall cooling air needs to decrease to control emissions. A combustor can have an inner and outer liner and tiles can be used to line the walls of combustor to aid in thermal control and heat dissipation. Tiles can have operating temperatures in excess of 1150° C. and are desirable to use in such extreme operating conditions.

Securing tiles to a surface, such as the metal liner of a combustor, requires a fastening system that is capable of operating in extreme temperatures. Traditionally bolts or studs have been used to secure tiles to the liner. However, bolts and other traditional fasteners, expand relative to their thermal environment. When the bolts expand the thermal expansion can result in a loss of fastener preload and can result in gaps which leak available cooling air and degrade performance of the cooling system. Over a period of time the hardware heats and cools repeatedly, which subjects the fastening system to potential variances.

Several problems exist when using metal fasteners for ceramics. One such issue is that at elevated temperatures, such as in a gas turbine engine, the relative thermal growth between a metal fastener and the ceramic is so great that the joint invariably becomes loose. A common approach could be to minimize the distance over which the thermal mismatch is applied. But the problem remains and becomes an issue of magnitude of the thermal growth.

The issue of bolts becoming loose at elevated temperatures due to thermal growth remains an unresolved problem throughout the gas turbine, and many other, industries, where high temperatures and metal fasteners are combined. Thus, the problem of fasteners thermally expanding and causing gaps or loosing of surrounding parts is an ongoing concern that could cause damage to machinery that are operating under such conditions.

Loosening can be compensated by re-torqueing fasteners or by installing a washer to fill the void that is created between the fastener and the structure which it secures. However, in a sealed system, such as a combustor for a gas turbine engine, it is not practical to disassemble the system to re-torque fasteners or install washers to remedy the situation. It would be desirable to provide an improved fastening system that overcomes the aforementioned problems.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary embodiment discloses an improved fastening system and method that overcomes traditional thermal mismatch that occurs with standard fastener systems that are employed in extreme temperature environments. The fastening system could employ a metallic fastener that is combined with metallic spacer, each of which having a differing thermal growth coefficient. This arrangement may reduce the mismatch in relative thermal expansion by several orders of magnitude over the range of temperatures where the thermal fastener can be applied.

Figure 1:
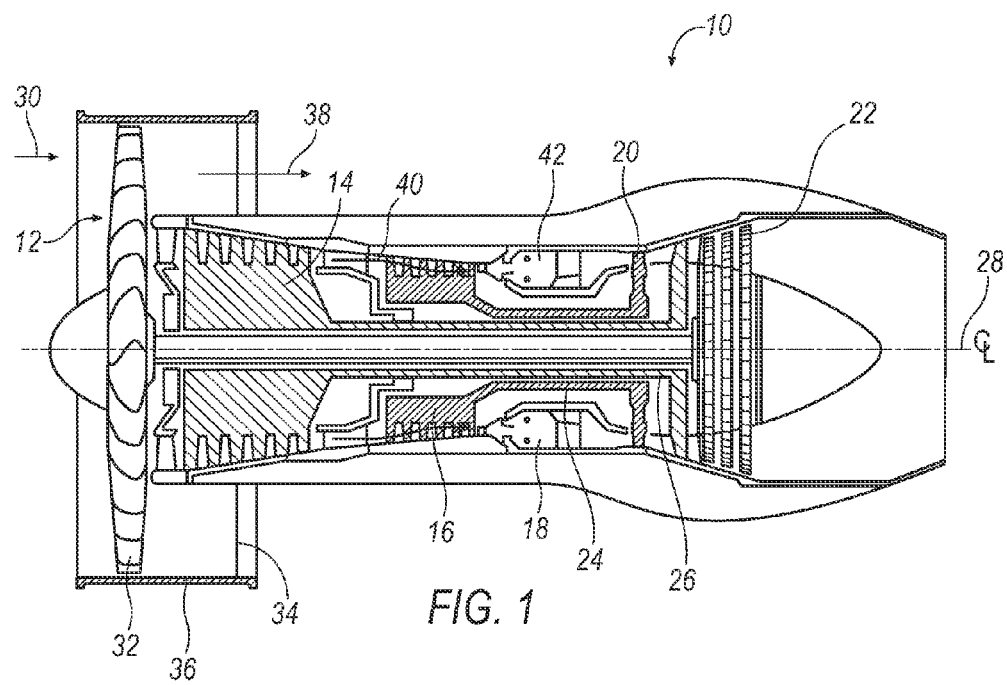
FIG. 1 illustrates a schematic view of a gas turbine engine employing the improvements discussed herein.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved combustor 18 having a bi-metal fastener assembly 42 for improved thermal growth compensation. It will be appreciated that the bi-metal fastener assembly 42 for improved thermal growth compensation could be used in other machinery and is not therefor limited to gas turbine engine environments.

Figure 2:
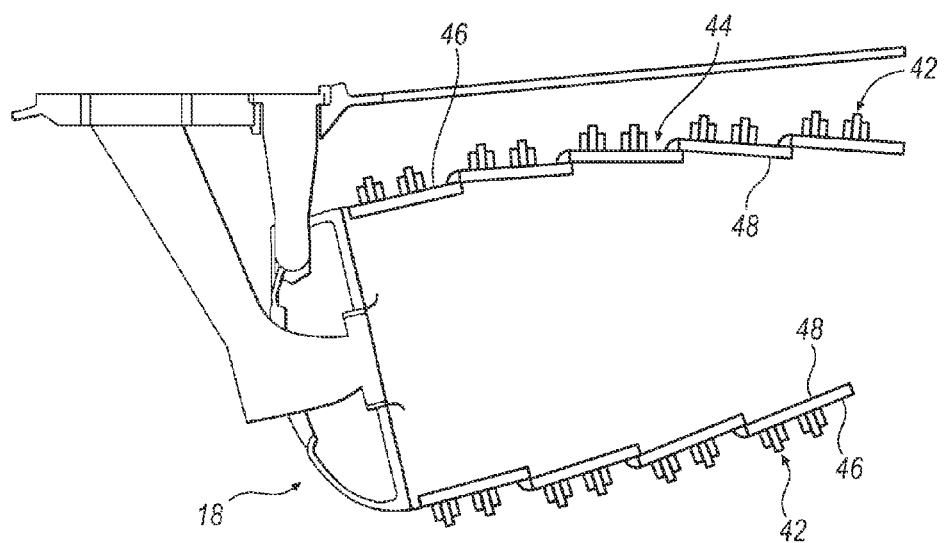
FIG. 2 illustrates a combustor for a gas turbine engine employing an exemplary bi-metal fastener system that is shown securing a tile to a combustor liner.

FIG. 2 illustrates one example of an improved bi-metal fastener assembly 42 being used in a combustor 18 of a gas turbine engine 10. The combustor 18 has an outer liner 44 and an inner liner 46 made of metal. Attached to the liners 44, 46 are ceramic tiles 48 that are secured by the novel bi-metal fastener assembly 42. It will be appreciated that the bi-metal fastener assembly 42 may be used in other applications apart from gas turbine engines.

When an object is heated or cooled, its length changes by an amount proportional to the original length and the change in temperature. Linear thermal expansion of an object can be expressed as:

$$\delta 1 = L0 \cdot \alpha \cdot (t1 - t0)$$

where: $\delta 1$=change in length (mm, inches)
L0=initial length (mm, inches)
$\alpha$=linear expansion coefficient (m/m ° C., in/in ° F.)
t0=initial temperature (° C., ° F.)
t1=final temperature (° C., ° F.)

Of elements of dissimilar thermal growth of linear coefficients are contemplated in the exemplary embodiment. Alpha $\alpha$ is the coefficient of linear expansion of a solid. The equation for thermal growth of two solids at the same temperature is $L1 * \Delta T(\alpha 1 - \alpha 2)$=relative growth. The variables of the formula are represented by the following:
L1=The thickness of a material number 1.
L2=The thickness of a material number 2.
$\Delta T$=The change in temperature.
$\alpha 1$=The thermal coefficient of expansion of material 1.
$\alpha 2$=The thermal coefficient of expansion of material 2.

As temperature rises two materials of dissimilar thermal growth coefficients will grow apart. This is particularly true in the case of ceramics, where the thermal growth coefficient is particularly low. But it can be true of even metals that are joined by fasteners of differing alphas, or situations that prevent adequate preload to maintain a tight attachment at elevated temperatures. Sample linear coefficients of thermal expansion for non-ceramic materials include the following:

| Product | Linear Temperature Expansion Coefficient - $\alpha$- | |
|---|---|---|
| | ($10^{-6}$ m/m K) | ($10^{-6}$ in/in ° F.) |
| Cast Iron Gray | 10.8 | 6.0 |
| Steel Stainless Austenitic (304) | 17.3 | 9.6 |
| Porcelain, Industrial | 6.5 | 3.6 |
| Clay tile structure | 5.9 | 3.3 |

Sample coefficients for linear expansion for exemplary ceramic matrix materials that could be used in gas turbine applications, are set forth below (units of $10^{-6}$ m/m K). It will be appreciated that other materials having other coefficients for linear expansion are contemplated by this disclosure.

TABLE 6.3

| Coefficients of linear expansion for candidate ceramic matrix materials (units of $10^{-6}$ K$^{-1}$). | |
|---|---|
| Silicon nitride (Si$_3$Ni$_4$) | 2.6 |
| Silicon carbide (SiC) | 4.4 |
| Graphite (C) | 4.5 |
| Alumina (Al$_2$O$_3$) | 7.7 |
| Partially stabilized zirconia (ZrO$_2$) | 10.6 |

Figure 3:
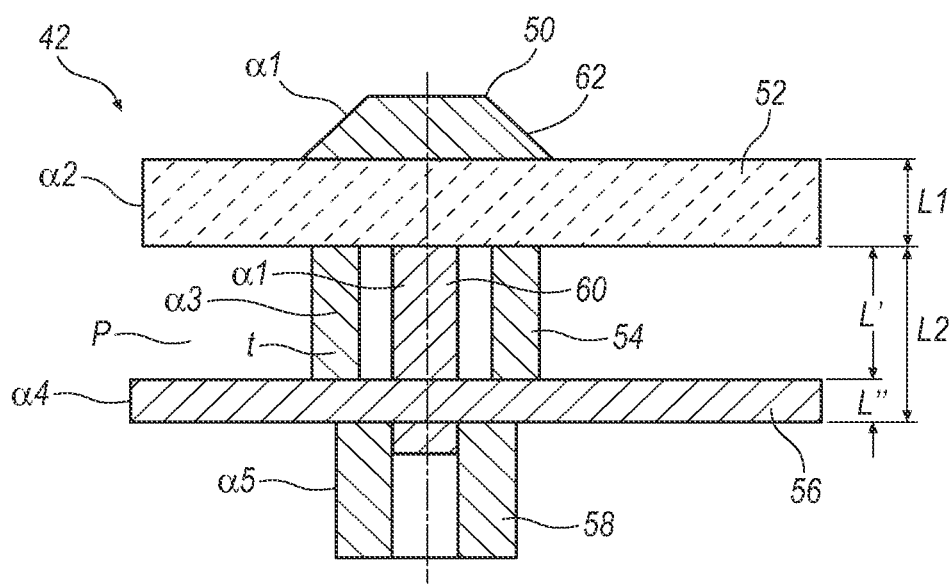
FIG. 3 illustrates an enlarged side cross sectional view of the exemplary bi-metal fastening system of FIG. 2, showing three materials of dissimilar thermal growth coefficients arranged in a tight attachment.

FIG. 3 illustrates a metal fastener system 42 having a fastener 50, a ceramic tile 52, a spacer 54, a combustor shell 56, and a nut or retainer 58. The fastener 50 has a shaft 60 and a cap 62 that are made of similar metal having a coefficient of linear expansion of $\alpha 1$. The tile 52 has a coefficient of linear expansion of $\alpha 2$, and a thickness of L1. The spacer 54 can be made of a metal and have a coefficient of linear expansion of $\alpha 3$, and a length of L'. The shape of the spacer 54 can be tubular, square or other geometric configuration. The spacer 54 has a thickness t which can be varied. The combustor shell 56 is made of metal and has a coefficient of linear expansion of $\alpha 4$, and a length of L". The length L' of the spacer 54 and the shell L" equal a combined thickness of L2. A retainer nut 58 has a coefficient of linear expansion of $\alpha 5$ and is securable to the shaft 60 of the fastener 50.

The embodiment shown in FIG. 3 depicts three components: 1) the ceramic tile 52 which could have a low alpha material of $\alpha 2$=2 $\mu$in/(in-° F.), 2) the metallic fastener 50 which has a medium alpha of $\alpha 1$=8 $\mu$in/(in-° F.), and 3) the spacer 54 and combustor shell 56 which have a combined high alpha $\alpha 3$ and $\alpha 4$=13 $\mu$in/(in-° F.). As shown in FIG. 3, if the alpha of the spacer 54 is greater than the alpha of the fastener 50, then it is possible to choose a length L' over which the spacer 54 spans to compensate for the thermal mismatch of the fastener 50 and the low alpha material ceramic tile 52 being fastened. The length required for the spacer 54 is defined by the alphas of the three materials and the span L1 being traversed by the fastener across the ceramic tile 52.

The preferred embodiment affords a ceramic tile 52 to be fastened tightly to a metallic shell 56 over a wide range of operating temperatures. This arrangement insures that the tiles 56 do not grow loose with elevated temperature. This minimizes engine vibration from shaking the ceramic tiles 56 to destruction in the event they may become loose. The fastener 50 remains tight and the tile 52 is lifted away from the shell 56 by the spacer 54. The spacer 54 acts also to provide a gap or plenum P of cooling air near the surface of the combustor shell 56.

Figure 4:
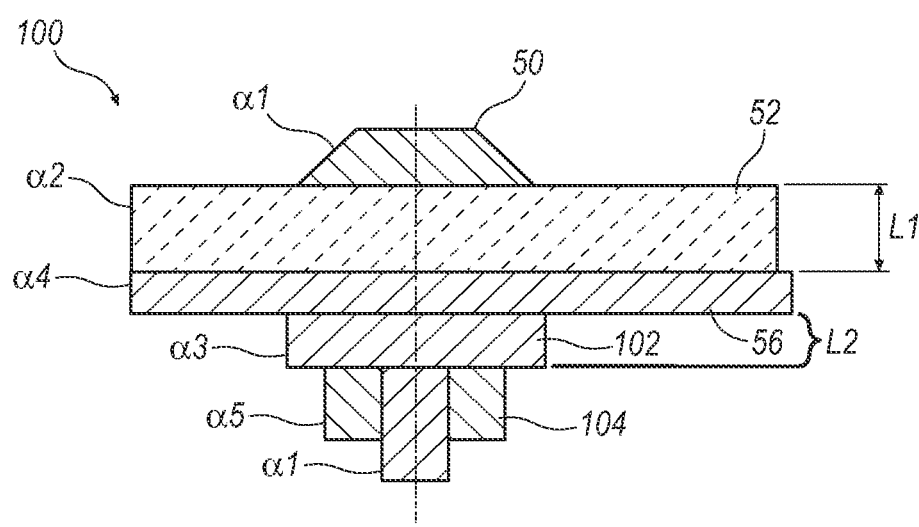
FIG. 4 illustrates an enlarged side cross sectional view of an alternative bi-metal fastening system that could be used in the FIG. 2 environment.

FIG. 4 illustrates an alternative embodiment multi-metal fastener assembly 100 that employs a fastener 50, a ceramic tile 52, a combustor 56, a washer 102 and a nut 104. The washer 102 has a coefficient of linear expansion of $\alpha 3$ and thickness of L2. The nut has a coefficient of linear expansion of $\alpha 5$. This embodiment does not offset the shell 56 from the tile 52, as in the FIG. 3 configuration, but instead the FIG. 4 embodiment places the spacer or washer 102 on the side of the combustor 56 opposite the tile 52. This arrangement provides direct contact between the tile 52 and the combustor shell 56. It may be preferred to use this arrangement in environments where the temperature of the combustor shell 56 can withstand the ceramic tile 52 temperatures.

A formula for determining three materials of dissimilar thermal growth coefficients and how they can be arranged to maintain tight attachment over a range of temperatures could be: $L1 * \Delta T(\alpha 1 - \alpha 2) = L2 * \Delta T(\alpha 3 - \alpha 1)$, where the variables within the formula have been defined above.

Other possible embodiments and variations are contemplated given the range of fasteners and applications. There can be multiple layers being fastened, and a variety of materials. But in addition to the basic fastener arrangement shown, a collar can be used to supply the thermal growth compensation.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A fastener system for use with a gas turbine engine comprising:
    a ceramic tile having a linear coefficient of expansion value of α2;
    a spacer having a linear coefficient of expansion value of α3;
    a combustor shell having a linear coefficient of expansion value of α4; and
    a securing member extending through the ceramic tile, spacer and combustor shell, the securing member having a linear coefficient of expansion value of α1,
    wherein the spacer has the linear coefficient of expansion α3 value that is greater than that of the securing member linear coefficient of expansion α1; and
    wherein the spacer is positioned between the combustor shell and the ceramic tile, and the spacer contacts a first surface of the ceramic tile and contacts a second surface of the combustor shell, and the spacer extends from the first surface to the second surface.

2. The fastener system as claimed in claim 1, further comprising a retaining member that is secured to the securing member, the retaining member having a linear coefficient of expansion value of α5.

3. The fastener system as claimed in claim 1, wherein the spacer is made of metal.

4. The fastener system as claimed in claim 1, wherein the spacer is a metal washer.

5. The fastener system as claimed in claim 1, wherein the spacer is disposed between the ceramic tile and the combustor shell to form an air space between the ceramic tile and the combustor shell.

6. The fastener system as claimed in claim 1, further comprising an air plenum disposed adjacent the ceramic tile for providing a space of cooled air for the fastener system.

7. The fastener system as claimed in claim 1, wherein the linear coefficient of expansion α3 of the spacer is such that it minimizes loosening of the fastening system during operation of a gas turbine engine.

8. The fastener system as claimed in claim 1, further comprising another securing member for fastening the ceramic tile to the combustor shell.

9. The fastener system as claimed in claim 1, further comprising another ceramic tile, another spacer, and another securing member, said another ceramic tile, another spacer, and another securing member are connected to said combustor shell.

10. The fastener system as claimed in claim 1, wherein said spacer is made of material that permits said spacer to expand to compensate for thermal mismatch of the fastener and the tile.

11. The fastener system as claimed in claim 1, wherein as thermal conditions change in which the fastener system is operating, said spacer expands or contracts to take up space that may occur between the combustor shell and the ceramic tile.

12. The fastener system as claimed in claim 1, wherein the spacer includes an inner radius, the inner radius being larger than an outer radius of the securing member such that a gap is formed between the spacer and the securing member.

13. A fastener for securing a ceramic matrix part in a combustor of a gas turbine comprising:
    a metal spacer having a linear coefficient of expansion value of α3;
    a threaded metal shaft extending through the spacer, the metal shaft having a linear coefficient of expansion value of α1;
    a metal shell of the combustor having a linear coefficient of expansion value of α4 through which the threaded metal shaft extends;
    a retaining member having a linear coefficient of expansion value α5 similar to the linear coefficient of expansion value of the threaded metal shaft α1; and
    a ceramic matrix part having a linear coefficient of expansion value of α2 that is lower than that of the spacer, the threaded metal shaft extending through the ceramic matrix;
    wherein the spacer has the linear coefficient of expansion α3 value that is greater than that of the threaded metal shaft linear coefficient of expansion α1 value; and
    wherein the spacer extends from a bottom surface of the ceramic matrix part to a top surface of the metal shell.

14. The fastener as claimed in claim 13, wherein the linear coefficient of expansion value α3 of the spacer is selected from a group of materials having a linear coefficient of expansion value that exceeds the sum of α1 and α2.

15. The fastener as claimed in claim 13, further comprising a gas turbine machine, said gas turbine machine includes a combustor shell and a tile positioned adjacent said metal shell, the fastener of claim 13 is used to secure said tile to said metal shell.

16. The fastener as claimed in claim 15, further comprising a plenum located between said tile and said metal shell, the plenum provides a space for spacer to grow or contract.

17. The fastener as claimed in claim 13, further comprising a gap between the metal spacer and the threaded metal shaft in an area of the threaded metal shaft that is between the ceramic matrix part and the metal shell.

18. A fastener system for securing a ceramic matrix part to a combustor of a gas turbine engine comprising:
    a ceramic matrix part having a linear coefficient of expansion value of α2;
    a metal spacer having a linear coefficient of expansion value of α3;
    a combustor liner having a linear coefficient of expansion value of α4;
    a fastener extending through the ceramic matrix part, the spacer, and the combustor liner, the fastener having a linear coefficient of expansion value of α1; and
    a retaining member secured to the fastener, the retaining member having a linear coefficient of expansion value of α5;
    wherein the metal spacer extends from the ceramic matrix part to the combustor liner and the metal spacer has the linear coefficient of expansion value of α3 greater then the linar coefficient of expansion value of α1 that maintains tight attachment of the ceramic matrix part and the combustor liner.

19. The fastener system for securing a ceramic matrix part to a combustor of a gas turbine engine as claimed in claim 18, wherein the metal spacer compensates for thermal mismatch of the fastener and the ceramic matrix part.

20. The fastener system for securing a ceramic matrix part to a combustor of a gas turbine engine as claimed in claim 18, further comprising a clearance between the metal spacer and the fastener and in an area between the fastener and the combustor liner.

* * * * *